D. S. KELLOGG & W. T. LINTNER.
CULINARY UTENSIL.

No. 185,109. Patented Dec. 5, 1876.

Attest:
H. B. Brine
Levi Bacon

Inventors.
Dayton S. Kellogg.
Wm. Thos. Lintner.
by attorney
Wm. H. Hinckel

THE GRAPHIC CO. N.Y.

UNITED STATES PATENT OFFICE.

DAYTON S. KELLOGG AND WILLIAM T. LINTNER, OF FORT PLAIN, N. Y.

IMPROVEMENT IN CULINARY UTENSILS.

Specification forming part of Letters Patent No. 185,109, dated December 5, 1876; application filed May 15, 1876.

*To all whom it may concern:*

Be it known that we, DAYTON S. KELLOGG and WILLIAM T. LINTNER, of Fort Plain, in the county of Montgomery, in the State of New York, have invented a new and useful Improved Combined Egg-Boiler, Colander, Vegetable-Grater, Flour-Sieve, and Dry-Measure, of which the following is a full, clear, and exact description:

The invention relates to a combination cooking utensil, consisting of an egg-boiler, colander, vegetable-grater, flour-sieve, and dry-measure combined in a single device, constructed of sides of sheet metal, having holes with sharp struck-up edges, like an ordinary vegetable-grater, one or more foraminous bottoms, a hinged handle, and a removable stand or pedestal, all as hereinafter specified.

Figure 1:
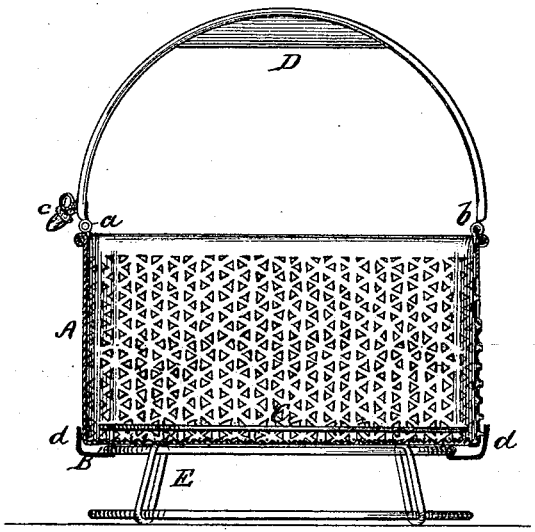
Figure 2:
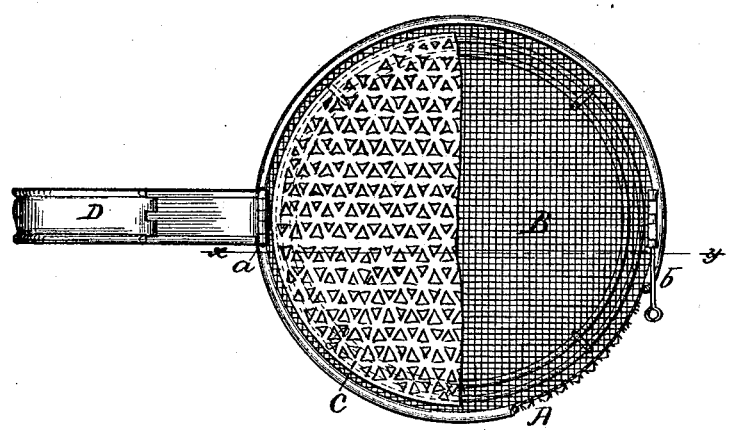

In the accompanying drawings, illustrating our invention, Figure 1 is a vertical section of the device mounted on the stand or pedestal. Fig. 2 is a top-plan view of same, with a portion broken away on the side to show the grater-surface, and also showing half of the auxiliary bottom.

The sides A of our combination cooking utensil are constructed of sheet metal, filled with holes having sharp struck-up edges projecting outwardly, and resembling ordinary vegetable-graters. The bottom B is preferably of fine-mesh wire-cloth, suitable for sifting flour, and is soldered or otherwise attached to the sides. It may be also of foraminous sheet metal; or an auxiliary perforated sheet-metal bottom, removable at pleasure, may be provided, and said auxiliary bottom (lettered C in the drawing) may have perforations therein similar to those in the sides. The foraminous bottom also serves, in conjunction with the sides, to constitute a colander or strainer. To the upper edge of the sides, by a hinge-joint, a, is secured a handle, D. This handle is secured at the opposite side of the utensil by a catch or lock, b, whereby said handle may be released at that end at pleasure. This catch or lock may be composed of interlocking eyes on the sides A and handle D, through which a removable pintle or pin is passed, resembling somewhat a hinge; but of course we do not wish to confine ourselves to such details of construction. To the hinge side of the handle is affixed an ornamental or other knob, c. When the handle is released at catch b and turned back, the knob c rests against the sides of the utensil, and serves as a stop or brace to hold said handle in a fixed position relative to the body of the utensil, whereby said utensil may be used as a scoop to gather flour, &c., thereinto.

E is a stand or pedestal, made of wire, and provided with spring or other hooks or catches d, for use in attaching it to the sides of the utensil. Any suitable catch or hook, or other fastening device, may be employed.

The uses of our device are as follows:

For boiling eggs, the body is filled with them and the whole placed in boiling water, the handle serving as a convenient device for manipulating the utensil.

As a colander or strainer, the vegetable or fruit is placed on either bottom, as may be desired, the utensil resting on the wire pedestal E, if necessary, within a suitable receptacle, and the substance treated as required.

As a vegetable-grater, the utensil is set on its side, the handle grasped in one hand, and the article to be grated passed back and forth over the roughened surface of the sides, in the ordinary manner.

When used as a sieve the handle serves as a means for imparting an alternating rotary motion to the utensil by grasping said handle in the hand and moving it alternately to the right and left.

The utensil is made in any suitable shape, and of required sizes, and is preferably provided with such graduations as will allow of its being used as a dry-measure. Such graduations may be made on the sides. Any suitable metal may be used in its construction. Its form ordinarily will be that of a basket or pail.

Having thus described our invention, what we claim is—

1. The above-described cooking or culinary utensil, adapted for use as an egg-boiler, colander, vegetable-grater, and flour-sieve, substantially as shown and specified.

2. The combination cooking utensil specified, provided with a hinged handle, D, having a stop, c, adapted for use substantially as described.

3. The removable or detachable pedestal E, constructed as shown, in combination with the cooking utensil herein described, for the purpose specified.

4. A cooking utensil composed of the grating sides A, foraminous bottom, and hinged handle, substantially as and for the purpose described.

DAYTON S. KELLOGG.
WILLIAM THOS. LINTNER.

Witnesses:
D. C. SHULTS,
PHILIP FAILING.